(12) United States Patent
Wang et al.

(10) Patent No.: US 11,016,364 B2
(45) Date of Patent: May 25, 2021

(54) VARIABLE APERTURE DEVICE, CAMERA DEVICE AND ELECTRONIC APPARATUS

(71) Applicant: New Shicoh Motor Co., Ltd., Zhejiang (CN)

(72) Inventors: Zaiwei Wang, Zhejiang (CN); Juhe Zhou, Zhejiang (CN)

(73) Assignee: NEW SHICOH MOTOR CO., LTD, Zhejiang (CN)

( * ) Notice: Subject to any disclaimer, the term of this patent is extended or adjusted under 35 U.S.C. 154(b) by 0 days.

(21) Appl. No.: 16/801,791

(22) Filed: Feb. 26, 2020

(65) Prior Publication Data

US 2020/0272026 A1 Aug. 27, 2020

(30) Foreign Application Priority Data

Feb. 27, 2019 (CN) .......................... 201910145100.6

(51) Int. Cl.
*G03B 9/14* (2021.01)
*G03B 17/56* (2021.01)

(52) U.S. Cl.
CPC ............. *G03B 9/14* (2013.01); *G03B 17/566* (2013.01)

(58) Field of Classification Search
None
See application file for complete search history.

(56) References Cited

U.S. PATENT DOCUMENTS

| 5,150,702 A * | 9/1992 | Miyanaga .......... A61B 1/00096 348/362 |
| 2020/0026149 A1* | 1/2020 | Jun .......................... G03B 9/06 |
| 2020/0264495 A1* | 8/2020 | Zhuo ........................ G03B 9/06 |
| 2020/0272026 A1* | 8/2020 | Wang ........................ G03B 9/14 |

* cited by examiner

*Primary Examiner* — William B Perkey
(74) *Attorney, Agent, or Firm* — Hayes Soloway PC

(57) ABSTRACT

A variable aperture device is described that includes a casing, a base with a light transmission hole, conductive terminals on the base, a terminal connecting portion, a shape memory metal wire, a movable portion, and a driven portion for forming an aperture together with the movable portion. One end of the shape memory metal wire is connected to the terminal connecting portion and the movable portion is connected to the base via a first rotating shaft. A side of the movable portion far from the light transmission hole around the first rotating shaft is connected to other end of the shape memory metal wire. A side of the movable portion near the light transmission hole around the first rotating shaft is connected to an elastic structure of the terminal connecting portion and the terminal connecting portion is attached to the conductive terminal.

10 Claims, 3 Drawing Sheets

VARIABLE APERTURE DEVICE, CAMERA DEVICE AND ELECTRONIC APPARATUS

CROSS-REFERENCE TO RELATED APPLICATION

This application claims the benefit of Chinese patent application CN 201910145100.6 filed on Feb. 27, 2019, the contents of which are incorporated by reference herein.

TECHNICAL FIELD

The present disclosure relates to the field of electronic apparatuses, and in particular to a variable aperture device, a camera device, and an electronic apparatus.

BACKGROUND

With the popularization of portable digital devices, camera devices are equipped in electronic apparatus such as notebook computers and mobile phones. These cameras are normally exposed to the outside, enabling others to control the camera device on the product through software, to perform a shooting behavior against the user's wills, and to expose the user's personal privacy.

However, the structure of the variable aperture device on the existing electronic apparatus cannot shield the lens to prevent privacy leakage.

Thus, those skilled in the art are committed to develop a novel variable aperture in order to overcome the above technical problems.

The present disclosure solves the problem of the conventional technology and provides a thin variable aperture device that can be mounted on a camera device built-in an electronic apparatus such as a notebook computer or a mobile phone, a camera device and an electronic apparatus applicable to shield the lens and prevent leak privacy.

SUMMARY

In accordance with a first aspect of the present disclosure, there is provided a variable aperture device comprising a casing, a base, conductive terminals and a terminal connecting portion. The base is provided with a light transmission hole, and the conductive terminals are mounted on the base. The variable aperture device further comprises a shape memory metal wire, a movable portion, and a driven portion for forming an aperture together with the movable portion. One end of the shape memory metal wire is connected to the terminal connecting portion. The movable portion is connected to the base via a first rotating shaft, a side of the movable portion far from the light transmission hole around the first rotating shaft is connected to other end of the shape memory metal wire, and a side of the movable portion near the light transmission hole around the first rotating shaft is connected to an elastic structure of the terminal connecting portion. The terminal connecting portion is attached to the conductive terminals, and, the shape memory metal wire and the terminal connecting portion are connected to the movable portion to form an electric circuit.

In accordance with a second aspect of the present disclosure, there is provided a camera device comprising a variable aperture device as described above.

Furthermore, in accordance with a third aspect of the present disclosure, there is provided an electronic apparatus comprising a camera device as described above.

DESCRIPTION OF THE DRAWINGS

The above and other features, properties and advantages of the present disclosure will become more apparent from the description in conjunction with the accompanying drawings and Examples. The same reference numerals in the drawings indicate the same elements, constitutions, and features.

DETAILED DESCRIPTION

Figure 1:
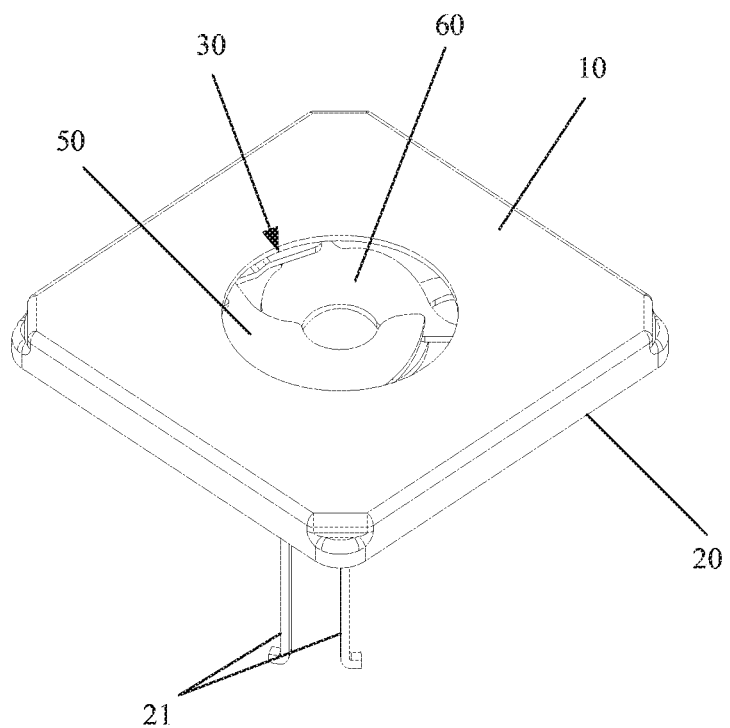
FIG. 1 is a perspective view of a variable aperture device of the present disclosure.

In order to make the above-described objects, features and advantages of the present disclosure more apparent and obvious, the specific embodiments of the present disclosure will be hereinafter described in detail with reference to the accompanying drawings.

Examples of the present disclosure will now be described in detail with reference to the accompanying drawings. Reference will now be made in detail to the preferred Examples of the present disclosure, and examples of which are illustrated in the accompanying drawings.

Wherever possible, the same reference numerals in the drawings will be used to refer to the same or like parts.

Further, although the terms used in the present disclosure are selected from well-known common terms, some of the terms mentioned in the specification of the present disclosure may be selected by the applicant according to his or her judgment, and the detailed meanings thereof are explained in the relevant parts of the description herein.

Furthermore, it is to be noted that the present disclosure shall be understood not only by the actual terms used, but also by the meaning implied in each term.

Figure 2:
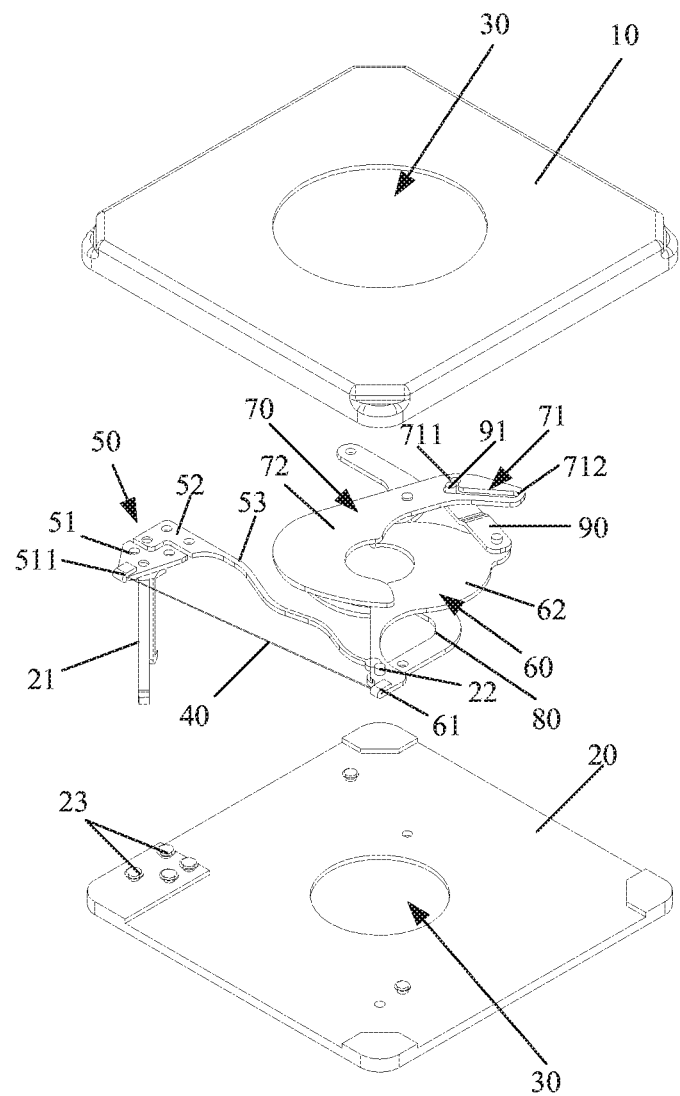
FIG. 2 is a first exploded view of the variable aperture device of the present disclosure.
Figure 3:
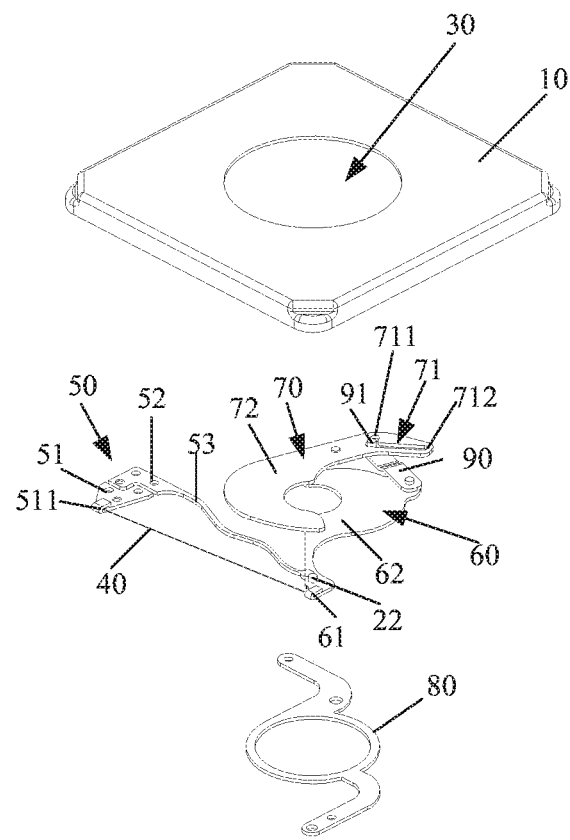
FIG. 3 is a second exploded view of the variable aperture device of the present disclosure.
Figure 3:
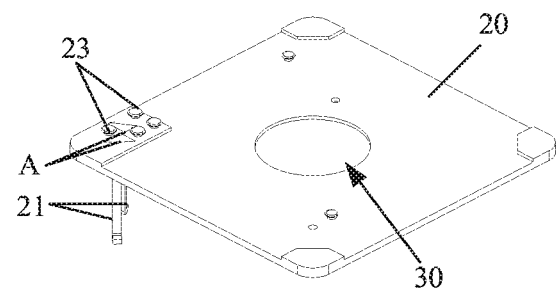

FIG. 1 is a perspective view of a variable aperture device of the present disclosure. FIG. 2 is a first exploded view of the variable aperture device of the present disclosure. FIG. 3 is a second exploded view of the variable aperture device of the present disclosure.

As shown in FIG. 1 to FIG. 3, the present disclosure discloses a variable aperture device including a casing 10, a base 20 and conductive terminals 21. The casing 10 and the base 20 are provided with a light transmission hole 30, and the conductive terminals 21 are mounted on the base 20. The variable aperture device further includes a shape memory metal wire 40, a terminal connecting portion 50, a movable portion 60 and a driven portion 70. One end of the shape memory metal wire 40 is connected to the terminal connecting portion 50, and the movable portion 60 is connected to the base 20 via the first rotating shaft 22. A side of the movable portion 60 far from the light transmission hole 30 around the first rotating shaft 22 is connected to the other end of the shape memory metal wire 40, and the a side of the movable portion 60 near the light transmission hole 30 around the first rotating shaft 22 is connected to the elastic structure of the terminal connecting portion 50. The elastic structure described herein may preferably be an elastic member (such as a spring plate) 53. The driven portion 70 is connected to the base 20 via the second rotating shaft 73.

Thus, the terminal connecting portion 50 is attached to the conductive terminals 21, and the shape memory wire 40 and the terminal connecting portion 50 are connected to the movable portion 60 to form an electric circuit. One ends of the conductive terminals 21 are fixed to the base 20, and the other ends extend downward along the base 20. A plurality of raised hot rivet studs (or soldering portions) 23 are disposed around one ends of the conductive terminals 21 and function to connect the conductive terminals 21 and the terminal connecting portion 50 to maintain a stable electrical connection.

When the power is not supplied, the shape memory metal wire 40 is in a natural state, and the spring plate 53 pulls the movable portion 60 to cover the light transmission hole. When a certain small current is controlled, the shape memory metal wire 40 contracts, and the elastic member 53 is stretched to expose a part of the light transmission hole (small aperture). Further, when a certain large current is controlled, the shape memory metal wire 40 further contracts, and the elastic member 53 is further stretched to expose the entire light transmission hole (large aperture).

The movable portion 60 and the driven portion 70 are rotatably connected by a connecting portion 90. One end of the connecting portion 90 is connected and fixed to the movable portion 60, and the end portion of the driven portion 70 is provided with a sliding groove 71. The other end of the connecting portion 90 is provided with a protrusion 91, and the protrusion 91 is mounted in the sliding groove 71. As the movable portion 60 is rotated, the protrusion 91 slides along the sliding groove 71. The sliding groove 71 extends aslant with respect to the locus drawn by the protrusion 91 and is preferably L-shaped. Thus, the movable portion 60 is rotated to drive the driven portion 70 to rotate around the second rotating shaft 73 and form a variable aperture structure.

Further, the variable aperture device further includes a supporting portion 80. The supporting portion 80 is fixed to the base 20 and has a first rotating shaft bearing hole 81 and a second rotating bearing hole 82. One end of the supporting portion 80 is rotatably connected to one end of the movable portion 60 to support the movable portion 60. That is, the supporting portion 80 is connected to the movable portion 60 via the first rotating shaft bearing hole 81 and the first rotating shaft 22. The supporting portion 80 is located between the movable portion 60 and the base 20, and can effectively prevent frictional chipping and prevent friction between the movable portion 60 and the base 20. Further, the supporting portion 80 is connected to the driven portion 70 via the second rotating shaft bearing hole 82 and the second rotating shaft 73.

Further, the other end of the shape memory metal wire 40 is connected to the movable portion 60. Here, the terminal connecting portion 50 preferably includes a first terminal connecting portion 51 and a second terminal connecting portion 52 that are electrically insulated, one end of the shape memory metal wire 40 is connected to the first terminal connecting portion 51, and the elastic member 53 of the second terminal connecting portion 52 is connected to an end portion of the movable portion 60.

As shown in FIG. 3, the conductive terminals 21 are connected to the first terminal connecting portion 51 and the second terminal connecting portion 52 in an A area on the base 20, respectively. the raised hot rivet studs (or soldering portion) 23 can ensure that the conductive terminals 21 are stably electrically connected to the first terminal connecting portion 51 and the second terminal connecting portion 52.

In particular, a first bent portion 511 is provided at the outer side of the first terminal connecting portion 51, and one end of the shape memory metal wire 40 is connected to the first bent portion 511. Similarly, a second bent portion 61 is provided at the outer side of the movable portion 60, and the other end of the shape memory metal wire 40 is connected to the second bent portion 61.

Furthermore, the movable portion 60 includes a first arc-shaped main body portion 62, and the driven portion 70 includes a second arc-shaped main body portion 72, the first arc-shaped main body portion 62 and the second arc-shaped main body portion 72 are overlapped corresponding to each other. When the movable portion 60 and the driven portion 70 move facing each other, an aperture with a variable diameter is formed between the first arc-shaped main body portion 62 and the second arc-shaped main body portion 72.

According to the structure described above, in the variable aperture device of the present disclosure, the terminal connecting portion 50 is connected to the shape memory metal wire 40 to form an electric circuit, and the shape memory metal wire 40 is driven by the current to move the movable portion 60. The shape memory metal wire 40 has elasticity and provides a restoring force, and also serves as a current conducting member. The shape memory metal wire 40, the movable portion 60 and the driven portion 70 can form a stable and controllable aperture structure.

When the shape memory metal wire 40 returns to its natural length from the above contacted state, since the elastic member 53 pulls the movable portion 60, the movable portion 60 is rotated counterclockwise around the first rotating shaft 22. The connecting portion 90 slides inward along the sliding groove 71 of the driven portion 70 until it slides up to the first end portion 711 at the innermost. Accordingly, the driven portion 70 is rotated counterclockwise around the second rotating shaft 73. The movable portion 60 and the driven portion 70 are rotated relative to each other in an overlapped manner until they are rotated to an overlapped and closed state, that is, the entire aperture is in a closed state.

When the shape memory metal wire 40 is energized and shortened, the movable portion 60 is rotated clockwise around the first rotating shaft 22. The connecting portion 90 slides outward along the sliding groove 71 of the driven portion 70 until it slides up to the second end portion 712 at the outermost. Accordingly, the driven portion 70 is rotated clockwise around the second rotating shaft 73. The movable portion 60 and the driven portion 70 are rotated relative to each other so that the aperture is gradually opened to become large, until they are rotated up to a fully opened state. The shape memory metal wire 40 thus provides a driving mode and a recovery force.

Based on the above structure, the present disclosure further provides a camera device including the variable aperture device as described above.

Based on the above structure, the present disclosure further provides an electronic apparatus including the camera device as described above.

In summary, since the variable aperture device of the present disclosure uses a shape memory metal wire, forms an electric circuit, activates the shape memory metal wire by an electric current, and activates the movable portion, a thin shape can be realized, and a camera device and electronic apparatus mounted with the variable aperture device can also be reduced in thickness. This variable aperture device can shield the lens and prevent privacy leakage. Further, a small aperture mode and a large aperture mode can be provided.

The preferred embodiments of the present disclosure have been described above with reference to the accompanying drawings, however, the present disclosure is not limited to these embodiments, and various modifications can be made according to the contents of the scope of the patent application.

While the specific embodiments of the present disclosure have been described above, those skilled in the art will appreciate that these are merely illustrative, and the protection scope of the present disclosure is defined by the appended claims. Those skilled in the art can make various changes or modifications to these embodiments without departing from the principles and spirit of the present disclosure, and such changes and modifications fall within the protection scope of the present disclosure.

What is claimed is:

1. A variable aperture device comprising:
   a casing;
   a base;
   conductive terminals;
   a terminal connecting portion;
   a shape memory metal wire;
   a movable portion; and
   a driven portion for forming an aperture together with the movable portion,
   wherein the base is formed with a light transmission hole, the conductive terminals are disposed on the base,
   one end of the shape memory metal wire is connected to the terminal connecting portion,
   the movable portion is connected to the base via a first rotating shaft, a side of the movable portion far from the light transmission hole around the first rotating shaft being connected to other end of the shape memory metal wire, a side of the movable portion near the light transmission hole around the first rotating shaft being connected to an elastic structure of the terminal connecting portion,
   the terminal connecting portion is attached to the conductive terminal, and
   the shape memory metal wire and the terminal connecting portion are connected to the movable portion to form an electric circuit.

2. The variable aperture device according claim 1, wherein:
   the movable portion and the driven portion are rotatably connected by a connecting portion,
   one end of the connecting portion is connected and fixed to the movable portion,
   an end portion of the driven portion is provided with a sliding groove,
   other end of the connecting portion is formed with a protrusion, the protrusion being disposed in the sliding groove, and
   the protrusion slides along the sliding groove with the rotation of the movable portion.

3. The variable aperture device according claim 2, wherein the sliding groove is L-shaped.

4. The variable aperture device according claim 1, further comprising a supporting portion, wherein
   one end of the supporting portion is rotatably connected to one end of the movable portion and fixed to the base to support the movable portion.

5. The variable aperture device according to claim 4, wherein the supporting potion comprises a first rotating shaft bearing hole and the supporting portion is connected to the movable portion via the first rotating shaft bearing hole and the first rotating shaft.

6. The variable aperture device according to claim 5, wherein
   the supporting portion comprises a second rotating shaft bearing hole, the driven portion is connected to the base via the second rotating shaft, and the supporting portion is connected to the driven portion via the second rotating shaft bearing hole and the second rotating shaft.

7. The variable aperture device according to claim 1, wherein
   the terminal connecting portion comprises a first terminal connecting portion and a second terminal connecting portion that are electrically insulated,
   the one end of the shape memory metal wire is connected to the first terminal connecting portion, and
   the elastic structure of the second terminal connecting portion is connected to the movable portion.

8. The variable aperture device according to claim 1, wherein:
   the movable portion comprises a first arc-shaped main body portion,
   the driven portion comprises a second arc-shaped main body portion,
   the first arc-shaped main body portion and the second arc-shaped main body portion are overlapped corresponding to each other, and
   when the movable portion and the driven portion move facing each other, an aperture with a variable diameter is formed between the first arc-shaped main body portion and the second arc-shaped main body portion.

9. A camera device comprising the variable aperture device according to claim 1.

10. An electronic apparatus comprising the camera device according to claim 9.

* * * * *